United States Patent [19]

Lapidot

[11] Patent Number: 5,078,339
[45] Date of Patent: Jan. 7, 1992

[54] UNMANNED AIRCRAFT HAVING A PIVOTABLY MOVABLE DOUBLE WING UNIT

[75] Inventor: Ehud Lapidot, Kiron, Israel

[73] Assignee: Israel Aircraft Industries Ltd., Israel

[21] Appl. No.: 549,384

[22] Filed: Jul. 6, 1990

[30] Foreign Application Priority Data

Jul. 7, 1989 [IL] Israel ........................................ 90903

[51] Int. Cl.⁵ ............................................. B64C 3/56
[52] U.S. Cl. ...................................... 244/49; 244/46; 244/3.24; 244/3.27; 244/3.28
[58] Field of Search ................. 244/46, 49, 3.24, 3.27, 244/3.28; 446/62, 66

[56] References Cited

U.S. PATENT DOCUMENTS

| | | | |
|---|---|---|---|
| 1,128,065 | 2/1915 | Short et al. | 244/49 |
| 1,151,297 | 8/1915 | Schröder | 244/49 |
| 1,296,578 | 3/1919 | Welsh | 244/49 |
| 1,353,179 | 9/1920 | Petrovitch | 244/49 |
| 1,376,785 | 5/1921 | Sellmer | 244/49 |
| 1,395,628 | 11/1921 | Bolas | 244/49 |
| 1,724,110 | 8/1929 | Reid | 244/91 |
| 1,808,344 | 6/1931 | Depue | 244/91 |
| 1,903,303 | 4/1933 | Tiling | 244/49 |
| 2,162,066 | 6/1939 | De Asis | 244/49 |
| 4,053,125 | 10/1977 | Ratony | 244/46 |
| 4,106,727 | 8/1978 | Ortell | 244/49 |
| 4,132,374 | 1/1979 | Abell | 244/46 |
| 4,471,923 | 9/1984 | Höppner et al. | 244/49 |
| 4,522,356 | 6/1985 | Lair et al. | 244/3.28 |
| 4,842,218 | 6/1989 | Groutage et al. | 244/3.28 |
| 4,913,378 | 4/1990 | Calvert | 244/46 |

FOREIGN PATENT DOCUMENTS

| | | | |
|---|---|---|---|
| 2725221 | 12/1978 | Fed. Rep. of Germany | 244/46 |
| 510684 | 12/1920 | France | 244/49 |
| 1597098 | 9/1981 | United Kingdom | 244/3.28 |
| 2190636 | 11/1987 | United Kingdom | 244/49 |

Primary Examiner—Joseph F. Peters, Jr.
Assistant Examiner—Anne E. Bidwell
Attorney, Agent, or Firm—Hill, Van Santen, Steadman & Simpson

[57] ABSTRACT

An aircraft including a fuselage and a double wing unit which is pivotably mounted onto the fuselage and arranged to selectably assume a first orientation, generally parallel to the fuselage, during storage and transport and a second orientation, generally perpendicular to the fuselage, for flight.

16 Claims, 4 Drawing Sheets

1

UNMANNED AIRCRAFT HAVING A PIVOTABLY MOVABLE DOUBLE WING UNIT

FIELD OF THE INVENTION

The present invention relates to aircraft generally and more particularly to unmanned aircraft.

BACKGROUND OF THE INVENTION

Various types of aircraft having folding wings or other portions are known. For example, airplanes designed for use on aircraft carriers are often constructed with wings that fold upward.

Unmanned aircraft, particularly of small sizes, are increasingly used in tactical situations, creating the need for efficient transport and storage of such aircraft.

SUMMARY OF THE INVENTION

The present invention seeks to provide an aircraft structure, particularly suitable for use in unmanned aircraft, which enables efficient storage and transport of such aircraft.

There is thus provided in accordance with a preferred embodiment of the present invention an aircraft including a fuselage and a double wing unit which is pivotably mounted onto the fuselage and arranged to selectably assume a first orientation, generally parallel to the fuselage, during storage and transport and a second orientation, generally perpendicular to the fuselage, for flight.

In accordance with one embodiment of the invention, the aircraft may be launched in the first orientation and automatically assumes the second orientation after launch. The reorientation may be achieved, for example, by operation of a spring, or alternatively, by operation of one or more motors. According to an alternative embodiment of the invention, the aircraft may be set up in the second orientation prior to launch.

In accordance with a preferred embodiment of the invention, the double wing unit comprises a box structure.

Further in accordance with a preferred embodiment of the invention, the box structure is configured so that when oriented in the second orientation, a rigid double wing box structure is provided.

Additionally, in accordance with a preferred embodiment of the invention, the box structure includes side aerodynamic elements joining the wings of the double wing elements adjacent their extreme ends.

According to a preferred embodiment of the invention, the side aerodynamic elements extend perpendicular to the first and second wings and are pivotably mounted with respect to first and second wings.

Further in accordance with a preferred embodiment of the present invention, the double wing unit includes a first wing which is offset with respect to a second wing along the longitudinal axis of the fuselage.

BRIEF DESCRIPTION OF THE DRAWINGS

The present invention will be understood and appreciated more fully from the following detailed description, taken in conjunction with the drawings in which.

DESCRIPTION OF THE PREFERRED EMBODIMENT

Figure 1A:
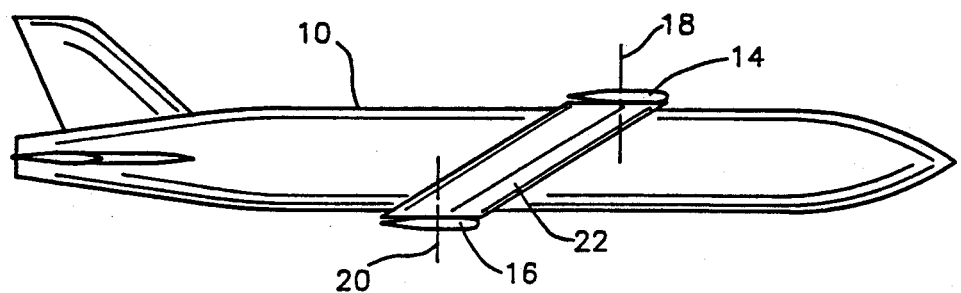
FIGS. 1A, 1B and 1C are respective side, top and front view illustrations of an aircraft constructed and operative in accordance with a preferred embodiment of the present invention in an orientation suitable for flight.

Reference is now made to FIGS. 1A-3B, which illustrate an aircraft, such as a small, unmanned aircraft, constructed and operative in accordance with a preferred embodiment of the present invention. The aircraft comprises a fuselage 10, which may be a conventional fuselage, containing all of the usual mechanical and control apparatus found in an aircraft of this type, and a wing assembly 12.

The wing assembly comprises a top wing 14 and a bottom wing 16, which are pivotably mounted onto respective top and bottom locations on the fuselage for selectable rotation about respective pivot axes 18 and 20. It is noted that in the illustrated embodiment, the top wing 14 is offset towards the front of the fuselage 10 with respect to the bottom wing 16. Alternatively, the bottom wing 16 may be disposed forwardly of the top wing 14. As a further alternative, both wings may be located in the same location, one on top of the other. Nevertheless, the offset arrangement is preferred.

In the illustrated embodiment of the invention, the top and bottom wings 14 and 16 are generally identical. This need not necessarily be the case, however, and the top and bottom wings may differ from each other, for example in one or more of the following ways: length, width, cross-sectional configuration.

Joining the extreme ends of the top and bottom wings 14 and 16 are respective side aerodynamic elements 22 and 24, which typically extend along planes perpendicular to the wings 14 and 16. Elements 22 and 24 are typically wing-like surfaces, which enhance sideways maneuverability of the aircraft and reduce induced drag thereof. Elements 22 and 24 are pivotably mounted onto the ends of wings 14 and 16 by means of mounting elements 26, which extend perpendicularly from extreme ends of elements 22 and 24 and lie in planes parallel to the planes of the wings 14 and 16. Elements 22 and 24 are seen to extend generally diagonally in a sweptback position with respect to the fuselage due to the offset of the wings with respect to the longitudinal axis of the fuselage, in the illustrated embodiment of the invention. It will be appreciated that the elements 22 and 24 may alternatively have other suitable configuration.

Pivotable connectors 28 (shown on axes 30) pivotably join wings 14 and 16 to elements 22 and 24 via the mounting elements 26, about respective pivot axes 30.

Figure 1B:
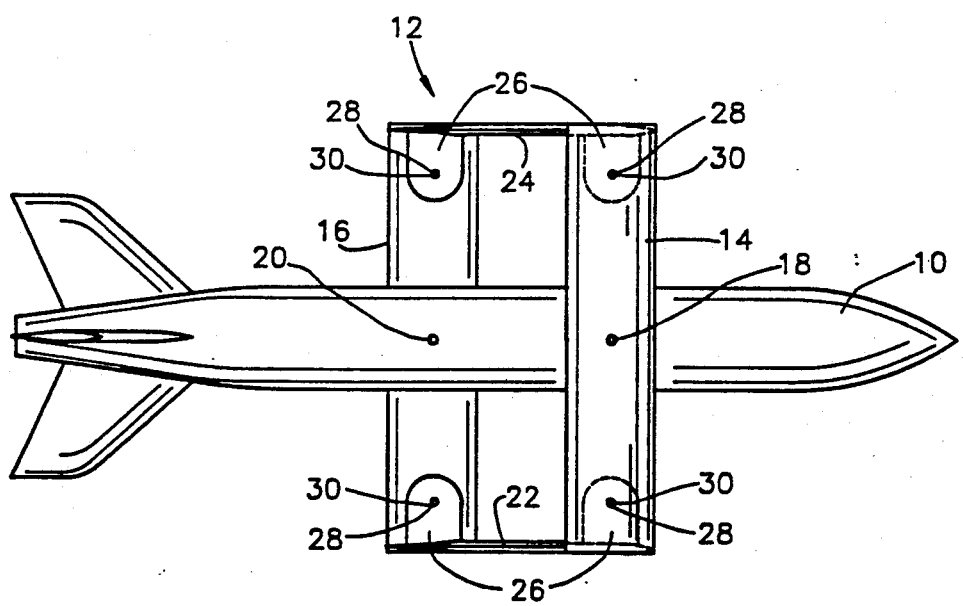
Figure 1C:
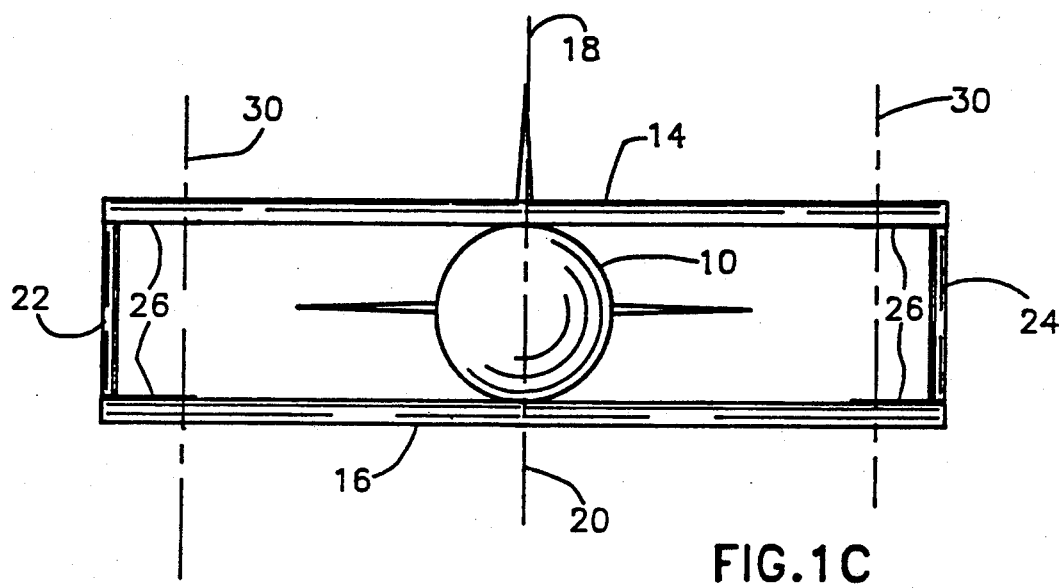
Figure 2C:
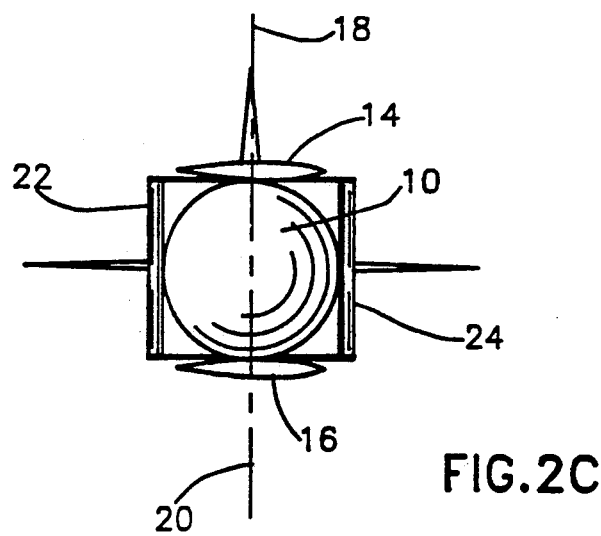
FIGS. 2A, 2B and 2C are respective side, top and front view illustrations of an aircraft constructed and operative in accordance with a preferred embodiment of the present invention in an orientation suitable for storage and transport.
Figure 2A:
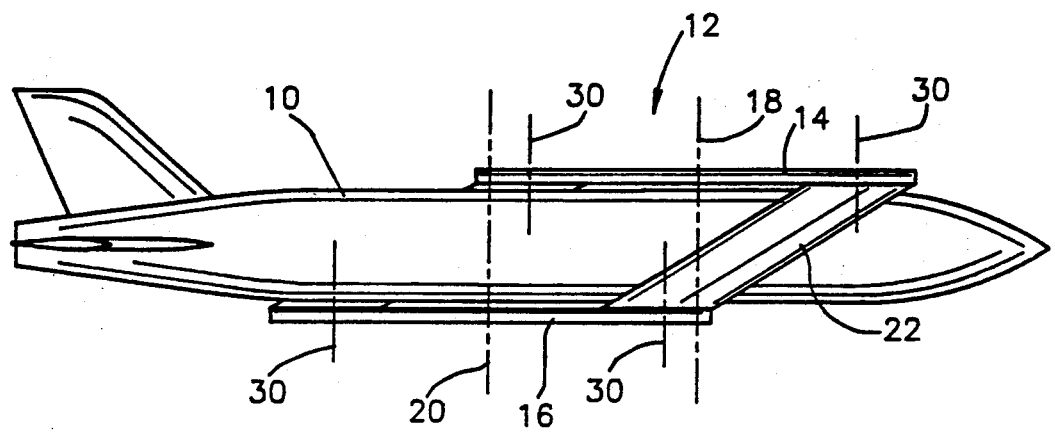
Figure 2B:
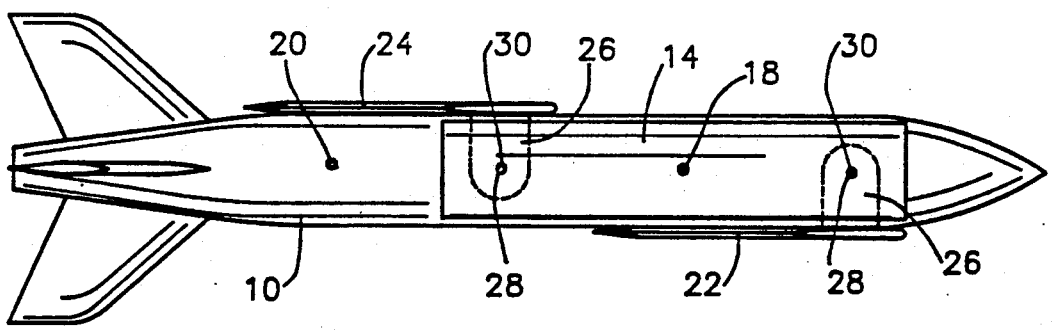
Figure 3A:
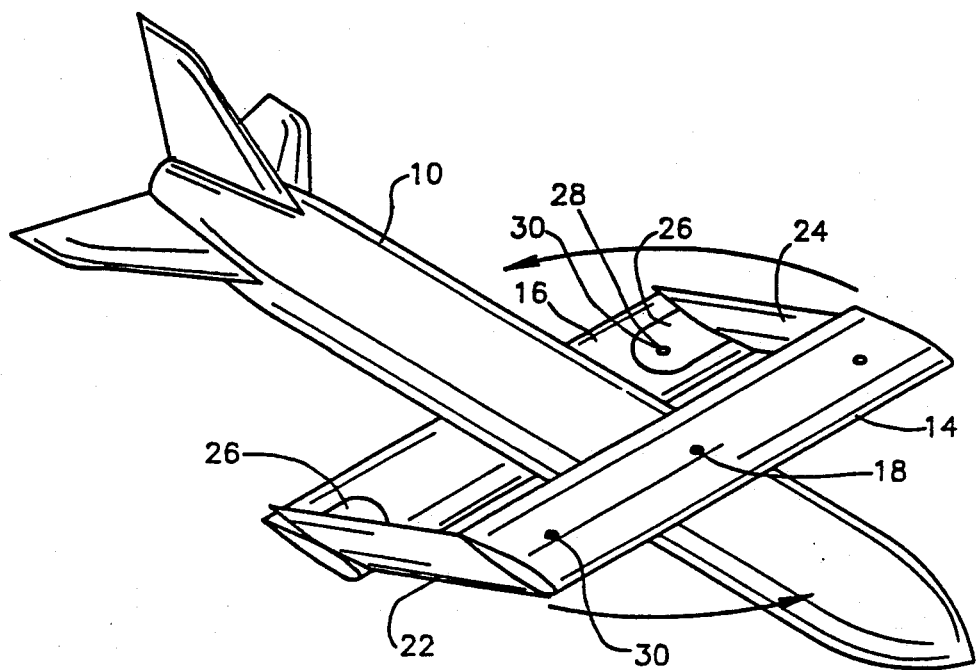
FIGS. 3A and 3B are pictorial illustrations of the conversion of the aircraft of FIGS. 1A-2C from a flight orientation to a storage orientation.
Figure 3B:
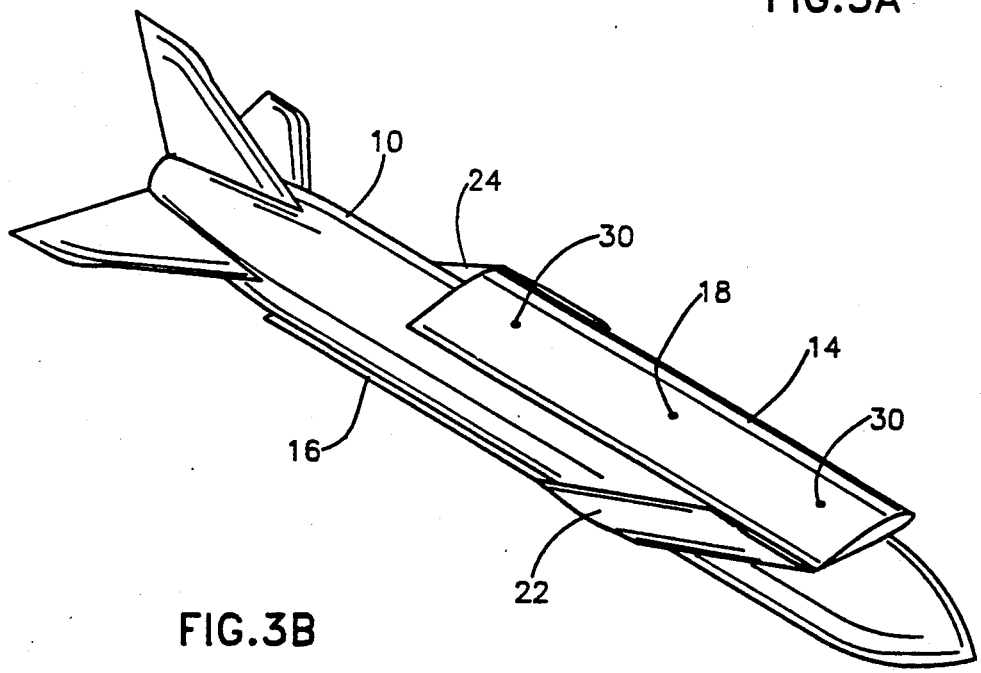

It is a particular feature of the present invention that the wing assembly 12 provides a generally rigid box wing construction during flight, as seen in FIGS. 1A–1C and which when folded into a storage orientation, as seen in FIGS. 2A–2C, is foldable over the fuselage so as to require very little additional space beyond that required by the fuselage.

Conversion of the aircraft from the storage and transport orientation illustrated in FIGS. 2A–2C to the flight orientation illustrated in FIGS. 1A–1C may be achieved either manually or alternatively by any suitable conventional mechanism, such as an electric motor mounted on or in the fuselage. Locking of the wing assembly 12 in a given orientation may be achieved using any suitable conventional mechanism. Such conversion is illustrated generally in FIGS. 3A and 3B.

It will be appreciated by persons skilled in the art that the present invention is not limited by what has been particularly shown and described hereinabove. Rather the scope of the present invention is defined only by the claims which follow:

I claim as my invention:

1. An aircraft comprising:
   a fuselage having a longitudinal axis; and
   a double wing unit which is pivotably mounted onto the fuselage and arranged to selectably assume a first orientation, generally parallel to the longitudinal axis of the fuselage, during storage and transport and a second orientation, generally perpendicular to the longitudinal axis of the fuselage, for flight, said double wing unit including:
   an upper wing unit arranged to pivot about said fuselage about a first pivot axis; and
   a lower wing unit arranged to pivot about said fuselage about a second pivot axis, spaced from said first pivot axis and offset therefrom along said longitudinal axis.

2. An aircraft according to claim 1 and wherein said aircraft comprises an unmanned aircraft.

3. An aircraft according to claim 2 and wherein said double wing unit comprises a box structure.

4. An aircraft according to claim 3 and wherein said box structure is configured so that when oriented in said second orientation, a rigid double wing box structure is defined.

5. An aircraft according to claim 4 and wherein said double wing unit comprises top and bottom wings and said box structure includes side aerodynamic element joining said top and bottom wings adjacent their extreme ends.

6. An aircraft according to claim 5 and wherein said side aerodynamic elements extend along planes perpendicular to said top and bottom wings and are pivotably mounted with respect thereto.

7. An aircraft according to claim 3 and wherein said double wing unit comprises top and bottom wings and said box structure includes side aerodynamic elements joining said top and bottom wings adjacent their extreme ends.

8. An aircraft according to claim 7 and wherein said side aerodynamic elements extend along planes perpendicular to said top and bottom wings and are pivotably mounted with respect thereto.

9. An aircraft according to claim 1 and wherein said double wing unit comprises a box structure.

10. An aircraft according to claim 9 and wherein said box structure is configured so that when oriented in said second orientation, a rigid double wing box structure is defined.

11. An aircraft according to claim 10 and wherein said double wing unit comprises top and bottom wings and said box structure includes side aerodynamic elements joining said top and bottom wings adjacent their extreme ends.

12. An aircraft according to claim 11 and wherein said side aerodynamic elements extend along planes perpendicular to said top and bottom wings and are pivotably mounted with respect thereto.

13. An aircraft according to claim 9 and wherein said double wing unit comprises top and bottom wings and said box structure includes side aerodynamic elements joining said top and bottom wings adjacent their extreme ends.

14. An aircraft according to claim 13 and wherein said side aerodynamic elements extend along planes perpendicular to said top and bottom wings and are pivotably mounted with respect thereto.

15. An aircraft according to claim 1 and wherein said double wing unit includes a pair of side aerodynamic elements which are pivotably mounted onto said upper and lower wing units and pivot axes which are offset from each other along said longitudinal axis.

16. An aircraft according to claim 15 and wherein said upper wing unit is disposed forward of said lower wing unit with respect to the longitudinal axis of said fuselage.

* * * * *